US005552039A

United States Patent [19]
McBrayer, Jr. et al.

[11] Patent Number: 5,552,039
[45] Date of Patent: Sep. 3, 1996

[54] TURBULENT FLOW COLD-WALL REACTOR

[75] Inventors: Roy N. McBrayer, Jr., Austin; James E. Deaton, Georgetown; James M. Eller, Austin, all of Tex.

[73] Assignee: RPC Waste Management Services, Inc., Austin, Tex.

[21] Appl. No.: 274,640

[22] Filed: Jul. 13, 1994

[51] Int. Cl.$^6$ .................................................. C02F 1/72
[52] U.S. Cl. .................... 210/90; 210/96.1; 210/177; 210/205; 210/232; 422/202; 422/205; 422/207; 422/208; 422/224; 422/240; 422/241; 422/242
[58] Field of Search ........................ 210/758, 761, 210/762, 85, 96.1, 177, 198.1, 205, 232; 422/184, 202, 207, 208, 224, 227, 228, 240, 241, 242, 205

[56] References Cited

U.S. PATENT DOCUMENTS

| | | | |
|---|---|---|---|
| 1,986,196 | 1/1935 | Grosse | 422/241 |
| 2,398,546 | 4/1946 | Messmore | 422/241 |
| 2,545,384 | 3/1951 | Rehrig | 422/241 |
| 2,824,058 | 2/1958 | Zimmermann | 210/761 |
| 2,944,396 | 7/1960 | Barton et al. | 60/39.464 |
| 3,047,003 | 7/1962 | Gurney | 137/100 |
| 3,047,371 | 7/1962 | Krause et al. | 422/207 |
| 3,282,459 | 11/1966 | Wilson | 422/242 |
| 3,449,247 | 6/1969 | Bauer | 210/63 |
| 3,464,885 | 9/1969 | Land et al. | 162/17 |
| 3,472,632 | 10/1969 | Hervert et al. | 23/290 |
| 3,515,520 | 6/1970 | Hervert | 422/242 |
| 3,606,999 | 9/1971 | Lawless | 23/1 |
| 3,682,142 | 8/1972 | Newkirk | 422/208 |
| 3,743,606 | 7/1973 | Marion et al. | 252/373 |
| 3,852,192 | 12/1974 | Fassell et al. | 210/761 |
| 3,853,759 | 12/1974 | Titmas | 210/63 |
| 3,876,497 | 4/1975 | Hoffman | 162/189 |
| 3,900,300 | 8/1975 | Lehman | 55/184 |
| 3,912,626 | 10/1975 | Ely et al. | 210/50 |
| 3,920,548 | 11/1975 | Fassell et al. | 210/761 |
| 3,929,429 | 12/1975 | Crouch | 48/201 |
| 3,938,972 | 2/1976 | Sugimura | 55/440 |
| 3,945,805 | 3/1976 | Costello et al. | 422/208 |
| 3,945,806 | 3/1976 | Costello et al. | 422/208 |
| 4,005,803 | 2/1977 | Kent | 222/57 |

(List continued on next page.)

FOREIGN PATENT DOCUMENTS

| | | |
|---|---|---|
| 0085961 | 8/1983 | European Pat. Off. . |
| 0135144 | 3/1985 | European Pat. Off. . |
| 0480492 | 4/1992 | European Pat. Off. . |
| 2410504 | 8/1979 | France . |
| 4003377 | 8/1991 | Germany . |
| 53-091093 | 8/1978 | Japan . |
| 521233 | 9/1976 | U.S.S.R. . |
| 483881 | 11/1977 | U.S.S.R. . |
| 576683 | 1/1980 | U.S.S.R. . |
| 90/01367 | 2/1990 | WIPO . |
| PCT/US92/ 06459 | 8/1992 | WIPO . |
| 92/18428 | 10/1992 | WIPO . |
| 92/21621 | 12/1992 | WIPO . |

OTHER PUBLICATIONS

A. G. Fassbender, Supercritical Water Oxidation Workshop, "The Dual Shell Pressure Balanced Vessel: A Reactor For Corrosive Applications," (11 pages).

Eco Waste Technologies, "Fact Sheet" and photograph of SCWO Pilot Plant, Aug. 1994 (2 pages).

Austin American–Statesman, Kirk Ladendorf, article entitled "Company Hopes Treatment Cuts Waste," (1 page), Aug. 25, 1994.

(List continued on next page.)

*Primary Examiner*—Peter A. Hruskoci
*Attorney, Agent, or Firm*—Conley, Rose & Tayon PC

[57] ABSTRACT

A high pressure and high temperature reactor, especially operating under supercritical water conditions combined with corrosive atmosphere. The reactor comprises a reaction chamber and a pressure vessel, which surrounds the reaction chamber. It has high integrity since it has only one penetration in the pressure vessel, and its size is minimized due to induced turbulent flow of the ignited reaction mixture.

65 Claims, 9 Drawing Sheets

U.S. PATENT DOCUMENTS

| | | | |
|---|---|---|---|
| 4,013,560 | 3/1977 | Pradt | 210/152 |
| 4,017,421 | 4/1977 | Othmer | 252/416 |
| 4,113,446 | 9/1978 | Modell et al. | 48/202 |
| 4,141,829 | 2/1979 | Thiel et al. | 210/63 |
| 4,199,545 | 4/1980 | Matovich | 422/112 |
| 4,215,094 | 7/1980 | Inao et al. | 423/123 |
| 4,217,218 | 8/1980 | Bauer | 210/63 |
| 4,221,577 | 9/1980 | Lowrie | 55/392 |
| 4,221,763 | 9/1980 | Greene | 422/241 |
| 4,229,296 | 10/1980 | Wheaton et al. | 210/758 |
| 4,272,383 | 6/1981 | McGrew | 210/741 |
| 4,284,015 | 8/1981 | Dickinson | 110/347 |
| 4,292,953 | 10/1981 | Dickinson | 126/263 |
| 4,326,957 | 4/1982 | Rosenberg | 210/436 |
| 4,338,199 | 6/1982 | Modell | 210/721 |
| 4,344,785 | 8/1982 | Jensen | 65/12 |
| 4,370,223 | 1/1983 | Bose | 208/125 |
| 4,377,066 | 3/1983 | Dickinson | 60/39.05 |
| 4,378,976 | 4/1983 | Rush | 55/15 |
| 4,380,960 | 4/1983 | Dickinson | 110/347 |
| 4,384,897 | 5/1983 | Brink | 127/37 |
| 4,460,628 | 7/1984 | Wheaton et al. | 427/214 |
| 4,526,584 | 7/1985 | Funk | 44/51 |
| 4,541,990 | 9/1985 | Mitterbacher | 422/241 |
| 4,543,190 | 9/1985 | Modell | 210/721 |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,643,890 | 2/1987 | Schramm | 422/241 |
| 4,668,256 | 5/1987 | Billiet et al. | 55/219 |
| 4,683,122 | 7/1987 | Concordia et al. | 261/77 |
| 4,698,157 | 10/1987 | Gillot | 210/496 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,792,408 | 12/1988 | Titmas | 210/747 |
| 4,793,153 | 12/1988 | Hembree et al. | 62/476 |
| 4,822,394 | 4/1989 | Zeigler et al. | 62/17 |
| 4,822,497 | 4/1989 | Hong et al. | 210/721 |
| 4,853,136 | 8/1989 | Roussel et al. | 210/761 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,878,543 | 8/1988 | Chornet et al. | 210/759 |
| 4,880,440 | 11/1989 | Perrin | 55/16 |
| 4,887,628 | 12/1989 | Bowe et al. | 137/8 |
| 4,891,139 | 1/1990 | Zeigler et al. | 210/747 |
| 4,898,107 | 2/1990 | Dickinson | 110/364 |
| 4,936,990 | 6/1990 | Brunsell et al. | 210/331 |
| 4,963,329 | 10/1990 | Burgess et al. | 422/168 |
| 4,968,328 | 11/1990 | Duke | 55/1 |
| 4,983,296 | 1/1991 | McMahon et al. | 210/603 |
| 5,009,857 | 4/1991 | Hearle | 422/180 |
| 5,011,614 | 4/1991 | Gresser et al. | 210/761 |
| 5,053,142 | 10/1991 | Sorensen et al. | 210/742 |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,133,877 | 7/1992 | Rofer et al. | 210/761 |
| 5,167,930 | 12/1992 | Fassbender | 422/112 |
| 5,183,577 | 2/1993 | Lehman | 210/761 |
| 5,186,910 | 2/1993 | Alagy et al. | 422/220 |
| 5,192,453 | 3/1993 | Keckler et al. | 210/761 |
| 5,199,853 | 4/1993 | Padden | 417/43 |
| 5,207,399 | 5/1993 | Risberg et al. | 244/172 |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |
| 5,280,701 | 1/1994 | Tolman | 210/181 |
| 5,326,540 | 7/1994 | Chastagner | 422/205 |
| 5,339,621 | 8/1994 | Tolman | 210/769 |
| 5,358,646 | 10/1994 | Gloyna et al. | 210/762 |
| 5,384,051 | 1/1995 | McGinness | 210/761 |
| 5,385,214 | 1/1995 | Spurgeon | 180/304 |
| 5,387,398 | 2/1995 | Mueggenburg et al. | 422/168 |
| 5,417,937 | 5/1995 | Voigt et al. | 422/189 |
| 5,417,953 | 5/1995 | Cappelli | 423/446 |
| 5,421,998 | 6/1995 | Li et al. | 210/136 |
| 5,425,883 | 6/1995 | Reid et al. | 210/761 |
| 5,437,798 | 8/1995 | LaRoche et al. | 210/761 |
| 5,454,950 | 10/1995 | Li et al. | 210/636 |

OTHER PUBLICATIONS

Jimmy Griffith, "Destruction of Aqueuos Organic Wastes by Supercritical Water Oxidation," Jun. 15–17, (12 pages).

Dr. Earnest F. Gloyna, P.E., "Supercritical Water Oxidation Applications For Industrial Sludges," Jan. 30, 1992, (pp. 1–15).

Earnest F. Gloyna and Lixiong Li, "Supercritical Water Oxidation: An Engineering Update," Feb. 1992, (pp. 1–25).

Separations Research Program Center for Energy Studies, The University of Texas at Austin, "Separations Update," Spring 1994 issue, (pp. 1–4).

E. F. Gloyna, L. Li and R. N. McBrayer, "Engineering Aspects of Supercritical Water Oxidation," Wat. Sci. Tech., vol. 30, No. 9, 1994, (pp. 1–10).

J. W. Tester et al., "Supercritical Water Oxidation Technology: A Review of Process Development and Fundamental Research," Oct. 1, 1991, 60 pages.

Chowdhury et al., "Catalytic Wet Oxidation of Strong Waste Waters", AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation—Deep Well Technology for Toxic Waste Waters and Sludges," Technical Report, The University of Texas at Austin, 1989.

Imamura et al., "Wet Oxidation of Acetic Acid Catalyzed by Co-Bi Complex Oxides," *Ind. Eng. Chem. Prod. Res. Dev.*, 21(4), pp. 570–575 (1982).

Lee et al., "Efficiency of Hydrogen Peroxide and Oxygen in Supercritical Water Oxidation of 2,4–Dichlorophenol and Acetic Acid," *The Journal of Supercritical Fluids*, 3 pp. 249–255 (1990).

Lu et al., "Selective Particle Deposition in Crossflow Filtration," *Sep. Sci and Technol.*, 24 (7&8), 517–540 (1989).

Mahlman et al., "Cross–Flow Filtration in Physical Chemical Treatment of Municipal Sewage Effluents," Oak Ridge Natl. Lab. Technical Report, EPA/600/2–76/025, Feb. 1976.

Modell et al., "Supercritical Waters—Testing Reveals New Process Holds Promise," *Solid Waste Management*, Aug. 1982.

Murkes, "Low–shear and High–shear Cross–flow Filtration," *Filtration and Separation*, 23(6), 364–365 (1986).

Murkes et al., *Crossflow Filtration: Theory and Practice*, John Wiley & Sons: New York, 1988.

Opatken, "Aqueous–Phas Oxidation of Sludge Using the Vertical Reaction Vessel System," EPA/600/2–87/022, Mar. 1987.

Perona et al., "A Pilot Plant for Sewage Treatment by Cross–Flow Filtration," Oak Ridge Natl. Lab. Technical Report ORNL–TM–4659, Oct. 1974.

Shapira et al., "Removal of Heavy Metals and Suspended Solids from Battery Wastewaters: Application of Hydroperm Cross-flow Microfiltration," Gen. Battery Corp. Report EPA/600/2–81–147, Aug. 1981.

Thomason et al., "Supercritical Water Destruction of Aqueous Wastes," *Hazardous Waste*, 1(4), 453–467 (1984).

Teletzke, "Wet Air Oxidation," *Chem. Eng. Prog.*, 60(1), pp. 33–38, Jan. 1964.

Yang et al., "Homogeneous Catalysis in the Oxidation of p–Chlorophenol in Supercritical Water," *Ind. Eng. Chem. Res.*, 27(1), pp. 2009–2014 (1988).

Zimmermann, "New Waste Disposal Process," *Chem. Eng.*, pp. 117–120, Aug., 1985.

Jacobs et al., "Phase Segregation," *Handbook of Separation Process Technology*, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep., 1989.

Todheide et al., "Das Zweiphasengebiet und die kritische Kurve im System Kohlendioxid–Wasser bis zu Druken von 3500 bar," *Zeitschrift fur Physikalischo Chemie Neue Folge*, Bd. 37, 8. 387–401 (1963).

Zimmermann et al., "The Zimmermann Process and Its Applications in the Pulp and Paper Industry," TAPPI, 43 (8), pp. 710–715 (1960).

Keng–Chen Chang et al., "Supercritical water oxidation of acetic acid by potassium permanganate," *J. of Hazardous Materials*, vol. 32, pp. 001–012.

Yoshiaki Harada, "Wet Catalytic Oxidation Process for Wastewater Treatment," Abstract (1991).

Sellchiro Imamura et al., "Wet Oxidation of Ammonia Catalyzed by Cerium–Based Composite Oxides," *Ind. Eng. Chem. Prod. Res. Dev.*, vol. 24, No. 1, pp. 75–80 (1985).

Lei Jin et al, "The Effect of Supercritical Water on the Catalytic Oxidation of 1–4–Dichlorobenzene," presented by AIChE Spring Meeting, Orlando, FL, Mar. 19–23 (1990), *Abstract*.

Dong–Soo Lee et al., "Efficiency of $H_2O_2$ in Supercritical Water Oxidation of 2, 4–Dichlorophenol and Acetic Acid," presented at AIChE Spring Meeting, Orlando, FL, Mar. 18–22 (1990).

Teletzke et al., "Components of Sludge and Its Wet Air Oxidation Products," *Journal WPCF*, 39 (6):944–1005, 1967.

Conditt and Sievers, "Microanalysis of Reaction products in Sealed Tube Wet Air Oxidations by Capillary Gas Chromatography," *Anal. Chem.*, 56:2620–2622, 1984.

McGinnis et al., "Conversion of Biomass into Chemicals with High–Temperature Wet Oxidation," *Ind. Eng. Chem. Prod. Res, Dev.*, 22(4):633–636, 1984.

Baker, et al, "Membrane Separation Systems — A Research & Development Needs Assessment," *Department of Energy Membrane Separation Systems Research Needs Assessment Group, Final Report, II,* Mar., 1990.

Urusova, "Phase Equilibria in the Sodium Hydroxide–Water and Sodium Chloride–Water Systems at 350–550 deg.," *Russian Journal of Inorganic Chemistry*, 19 (3):450–454, 1974.

Valyashko, "Phase Equilibria in Water–Salt Systems: Some Problems of Solubility at Elevated Temperature and Pressure," *High Temperature High Pressure Electrochemistry on Aqueous Solutions*. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," *Society of Automotive Engineers, Inc.,* pp. 189–203, 1990.

Dell–Orco et al., "The Solubility of 1:1 Nitrate Electrolytes in Supercritical Water," *Los Alamos National Lab Report,* LA–UR–92–3359, pp. 1–17, 1992.

Martynova, "Solubility of Inorganic Compounds in Subcritical and Supercritical Water," *High Temperature High Pressure Electrochemistry in Aqueous Solutions*. National Association of Corrosion Engineers, 4:131–138, 1976.

Armellini and Tester, "Solubilities of Sodium Chloride and Sodium Sulfate in Sub– and Supercritical Water Vapor," AIChE National Meeting, Los Angeles, California, Nov. 17–22, 1991, pp. 1–15.

McBrayer et al., "Research and Development of a Commercial Supercritical Water Oxidation Process," Hazardous Material International 1993, Proceedings, 11th Annual Eng. Management and Technology Conference.

"Researchers Explore Applications for Supercritical Water Oxidation," *The Hazardous Waste Consultant,* Mar./Apr. 1994, pp. 1.11–1.15.

Killilea et al., "The Fate of Nitrogen in Supercritical Water Oxidation" MODAR, Inc., Natick, Massachusetts 01760 USA.

TURBULENT FLOW COLD-WALL REACTOR

1. FIELD OF THE INVENTION

This invention relates to high pressure and high temperature reactors. More particularly, it relates to reactors used for oxidative waste treatment under supercritical water conditions.

2. BACKGROUND OF THE INVENTION

A number of different ways for disposing of waste have been used extensively. Landfilling and incineration are the major ones, which however, do not seem to offer the best solution.

Landfilling is becoming less and less desirable since it does not offer elimination of waste, but just underground storage. Thus, it has started to be used more for by-products of other types of waste management, such as incineration for example, than for landfilling the primary waste.

Incineration, requiring oxidation of waste at high temperatures with high volumes of air, followed by separation of the effluent gases from the produced ash and the entrained particulate matter, becomes involved, complicated, and expensive, despite the fact that at first glance it sounds to be a simple process of "just burning the waste".

In recent years, a new method, based on supercritical water oxidation, has started being developed. The new method achieves substantially complete oxidation of waste by using considerably more compact equipment, thus becoming an excellent candidate for elimination of waste, even on site. Supercritical water oxidation also has the advantage of producing a clean water product suitable for process recycle, thereby facilitating waste minimization. In addition, it has the advantage of converting spent, costly catalysts (e.g., noble metals in both inorganic and organically bound compounds) to forms which may be more easily recovered, thereby facilitating both waste minimization and cost reduction. However, as with the development of any new process or equipment, there are numerous problems which have not been resolved so far, and which are vital for a finally successful use and commercial exploitation.

In a water liquid/vapor phase diagram, one may see that there is a critical point of temperature (about 720° F.) and a critical point of pressure (about 3,200 psia) over which there is only one single fluid phase.

Although the single phase represents neither liquid nor vapor, it behaves and seems to have more of a gas character than of a liquid one at pressures near the critical pressure. As pressure is raised, a more liquid like behavior is observed, including higher solubility of inorganic matter. The single-phase condition occurring above the critical points is called supercritical condition.

It is worth noting that organic matter decomposes readily under supercritical conditions, and, in the presence of oxygen, carbonaceous compounds oxidize completely to carbon dioxide, sulfur compounds mostly to $SO_3$ and nitrogen compounds decompose mostly to molecular nitrogen. It is worth noting that under supercritical water oxidation conditions, only small amounts of nitrogen oxides are produced, if any, in contrast with incineration which favors the production of nitrogen oxides. Inorganic salts are substantially insoluble in the supercritical water single phase for pressures of the order of 4,000 psia, while it has been reported that they are at least partially soluble at considerably higher pressures, such as 10,000 psia, for example.

The use of very high pressures at elevated temperatures presents a serious problem in the construction of reactors which can withstand these adverse conditions. It is well known that as the temperature increases the strength of materials decreases drastically. Supercritical pressures (greater than about 3,200 psia) at temperatures exceeding about 1,000° F. present an enormous challenge to any construction material, let alone higher pressures (of the order of 10,000 psia) and temperatures, which may be desirable for a number of reasons, including dissolution of inorganic salts in the supercritical single phase. If in addition to the temperature/pressure challenge, one considers the harsh environment inside the reactor, the problem tends to become insurmountable.

In order to compromise with this highly undesirable situation, excessively elongated reactors of accordingly small diameter have been practically utilized so far. These conventional reactors, however, have a number of disadvantages which include, but are not limited to restrictions on waste feed materials to preclude corrosive feeds and products of destruction, increased plugging potential due to small diameters, waste feed rate restrictions, increased safety hazards, increased investment cost, and safety hazards, as it will be discussed later, in contrast to the reactor according to this invention.

A number of patents have been dealt in general with supercritical water oxidation of coal, organic substances, and waste, among which are U.S. Pat. Nos. 4,141,829 (Thiel et al.), 4,292,953 (Dickinson), 4,338,199 (Modell), 4,377,066 (Dickinson), 4,380,960 (Dickinson), 4,543,190 (Modell), 4,564,458 (Burleson), 4,593,202 (Dickinson), 4,594,164 (Titmas), 4,792,408 (Titmas), 4,822,394 (Zeigler et al.), 4,822,497 (Hong et al.), 4,861,497 (Welch et al.), 4,891,139 (Zeigler et al.), 5,075,017 (Hossain et al.), 4,113,446 (Modell et al.), 4,338,199 Reexamined (Modell), 5,106,513 (Hong), 4,898,107 (Dickinson), 4,983,296 (McMahon et al.), 5,011,614 (Gresser et al), 5,053,142 (Sorensen et al.), 5,057,231 (Mueller et al.), 5,106,513 (Hong), 5,133,877 (Rofer et al.), 5,183,577 (Lehmann), 5,192,453 (Keckler et al.), 5,221,486 (Fassbender), 5,232,604 (Swallow et al.), 5,232,605 (Baur et al.), 5,240,619 (Copa et al.), 5,250,193 (Sawicki et al.), and 5,252,224 (Modell et al.) all of which are hereby incorporated by reference.

U.S. Pat. No. 3,472,632 (Hervert et al) discloses an internally lined reactor comprising an external pressure retaining chamber, an intermediate porous metal layer within the chamber, and a continuous metal liner positioned along the inner wall of the porous layer. A metal casing encompasses and is spaced from the external chamber. Partitions divide the space between chamber and casing into a number of separate compartments encompassing the chamber. A number of spaced apart leakage passageways are extended through and distributed over the surface of the chamber, and at least one monitoring passageway for each compartment is provided through the casing.

U.S. Pat. No. 3,515,520 (Hervert) discloses a reactor for accommodating corrosive materials wherein a corrosion liner is suspended within an outer reaction chamber and in a non-contacting relationship therewith, the chamber having an inlet for non-corrosive gases at its lower end admitting such gases to the annular space between liner and chamber with a passageway at the top of the liner for admission of such gases, and an adjacent corrosive fluid inlet into the liner with centrally disposed discharge means from said liner for exit of reaction products of the corrosive and non-corrosive gases.

U.S. Pat. No. 4,199,545 (Matovich) discloses a fluid-wall reactor for high temperature chemical reactions comprising (A) a porous reactor tube made of fabric or fibrous refractory material and defining a reaction zone; (B) a pressure vessel enclosing the reactor tube to define an inert fluid plenum, the pressure vessel having at least one inlet for admitting the inert fluid which is directed under pressure through the porous tube wall to provide a protective blanket for the inside surface for the inside surface of the reactor tube; (C) means for introducing at least one reactant into the reaction zone; (D) means in the plenum for heating the reactor tube; and (E) a heat shield disposed within the pressure vessel, substantially enclosing the heating means and the reaction zone to define a black body cavity, the heat shield reflecting radiant energy toward the reaction zone.

U.S. Pat. No. 4,643,890 (Schramm) discloses a reactor tube for a high-temperature fluid wall reactor made of refractory material which permits the tube to be heated to incandescence. The reactor tube in turn radiates energy inwardly to a reaction zone to sustain the desired high-temperature reaction. At least part of the tube is perforated to permit an inert gas to form a protective fluid wall for preventing the reactant products from contacting the inner surface of the tube.

U.S. Pat. No. 4,737,348 (Levin) discloses a reactor apparatus for continuously producing molten, solar grade purity elemental silicon by thermal reaction of a suitable precursor gas, such as silane.

U.S. Pat. No. 5,186,910 (Alagy et al.) discloses an oxidation reactor having an elongated shape and including in combination, a mixing member having a pipe for feeding oxidizing gas and a pipe for feeding oxidizable charge; a reaction member, arranged subjacent the mixing member; and a discharge member associated with a discharge pipe for the products of the reaction. The reaction member includes a central zone which has a first lining and the reactor includes at least one peripheral zone, which has a second lining, passages in the second lining being smaller than passages in the first lining so that the pressure loss in the second lining is greater than that of the first lining. The second lining forms a sleeve surround the first lining and this sleeve is formed of at least one refractory heat insulating material. The oxidation reactor is provided with an external sleeve steel jacket, a concrete wall and a steel element surrounding the mixing member arranged above the reaction member. The reaction member includes a series of single elements which form juxtaposed channels.

U.S. Pat. No. 5,225,169 (Elvin et al. ) discloses an improved sulfider for receiving high temperature catalysts from a hydrocarbon cracking operation and subjecting the catalyst to a sulfur-containing gas. The treating unit includes an outer metal housing and firs refractory layer within the metal housing for minimizing heat loss from the treatment unit. A second refractory layer is provided within the firs refractory layer and defines an interior chamber within the treatment unit, and a plurality of heating units are spaced circumferentially along the interface of the first and second refractory layers. The heating units substantially minimize the temperature differential across the second refractory layer and thereby minimize the heat loss from the high temperature catalyst within the chamber.

None of the above references has resolved the vital problem of pressure/temperature/harsh-environment in a satisfactory manner, and especially under supercritical water conditions.

Our co-pending applications Ser. No. 08/188,229, filed on Jan. 27, 1994, and Ser. No. 08/260,954, filed on Jun. 16, 1994 describe reactors of the cold wall type. However, they do not consider the desirability of turbulent flow within the reactor, the role of a solid porous thermal insulation, and other critical parameters of the present invention, which will be discussed in detail hereinbelow.

3. SUMMARY OF THE INVENTION

This invention pertains to high pressure and high temperature reactors. It pertains especially to reactors operating under supercritical water conditions combined with corrosive atmosphere, wherein the pressure/temperature/harsh environment conditions cannot be handled by the reactors of the presently existing art. This invention relates, more particularly, to a reactor for treating aqueous waste liquids, comprising an assembly of a pressure vessel having a substantially cylindrical shape, a top vessel end and a bottom vessel end opposite the top vessel end;

a reaction chamber enclosed within the pressure vessel, the reaction chamber having a similar shape as the pressure vessel, and also having a top chamber end, a bottom chamber end, an inside wall and an outside wall, the pressure vessel and the reaction chamber forming an annulus, the reaction chamber defining a reaction zone, the reaction zone being isolated from the annulus;

a feeding tube ending in a fluid exit in a reaction ignition zone in the vicinity of the top chamber end, the fluid exit directed toward said chamber top end in a manner to produce turbulent flow of fluids comprising the aqueous waste liquid and oxidant exiting said exit and impinging on said chamber top end; and an effluent output at the bottom vessel end.

Preferably, the reactor further comprises a quencher at the bottom vessel end, and a thermal insulator within the annulus, which preferably is substantially filled with said thermal insulator.

The thermal insulator may be in the form of packed high-temperature resistant material, preferably selected from a group consisting of high temperature beads, high temperature powder, high temperature solid porous material, and a combination thereof.

It is important that the thermal insulator provides adequate porosity for an inert fluid (liquid or gas) to pass through, and preferably the thermal insulator has a strong enough character to provide mechanical support to the reaction chamber.

An inert fluid inlet may be used to introduce inert fluid to the annulus in order to maintain a pressure higher than the pressure prevailing in the reaction zone. A detector connected to the annulus and adaptable to detect accidental communication between the reaction zone and the annulus may also be used. The annular space may also be at a pressure equal to or lower than the pressure in the reaction chamber, providing design stress limitations on the reaction chamber wall are not exceeded. This is especially true for long reactors with very thin walls, wherein the potential of buckling and/or collapsing of the reactor chamber is high. In such a case, the pressure in the annulus may preferably be in the range of 0–300 psia lower than the pressure prevailing in the reaction zone.

Although an inert gas is preferred as compared to an inert liquid, and in many occasions in this discussion the word inert "gas" is used for pressurizing the annulus, it should be understood that an inert "liquid" can also be used. Of course, the inert gas or liquid should not decompose under the operating conditions within the annulus.

When, for the purposes of this invention, a substance is called a gas or a liquid, it is substantially in the state of a gas or a liquid under the prevailing operating conditions in each particular case.

The inside wall of the reaction chamber may be covered with a liner material resistant to attack by reactants, products of reaction and effluent gases. The reaction chamber itself may be constructed of a material resistant to attack by reactants, products of reaction, and effluents. This material may comprise titanium, a noble metal, ceramics, and the like. It is preferable that titanium is used in the case that the waste feed contains halogenated compounds, while a noble metal, especially in the form of a liner, may be preferably used for non-halogenated waste streams.

In many occasions it is preferable that the reaction chamber is removable from the reaction chamber, so that it may be serviced, replaced, and the like.

The reactor may further comprise a supplemental tube contained within the feeding tube and being substantially concentric with the feeding tube, for introducing first constituents in said feeding tube.

The reactor may also comprise an additive tube at least partially surrounding the feeding tube and being substantially concentric with the feeding tube, for introducing second constituents in the reaction zone.

The present invention also pertains to a method for treating aqueous waste liquids comprising the steps of:

introducing waste into a reactor, the reactor comprising an assembly of a pressure vessel having a substantially cylindrical shape, a top vessel end and a bottom vessel end opposite the top vessel end;

a reaction chamber enclosed within the pressure vessel, the reaction chamber having a similar shape as the pressure vessel, and also having a top chamber end, a bottom chamber end, an inside wall and an outside wall, the pressure vessel and the reaction chamber forming an annulus, the reaction chamber defining a reaction zone, the reaction zone being isolated from the annulus;

a feeding tube ending in a fluid exit in a reaction ignition zone in the vicinity of the chamber top end, the fluid exit directed toward said chamber top end in a manner to produce turbulent flow of fluids comprising the aqueous waste liquid and oxidant exiting said exit and impinging on said chamber top end; and an effluent output at the bottom vessel end.

maintaining within the reaction chamber a reaction zone having a predetermined temperature and pressure in order to oxidize the aqueous waste liquid and produce an effluent gas of substantially complete combustion;

maintaining a pressurized inert fluid in the first annulus in a manner to prevent any reactants, products of reaction, and effluent gas from entering said annulus; and disposing of the effluent gas.

It is preferable to minimize the required reaction chamber wall thickness by maintaining an adequately small differential pressure between the reaction chamber and the annulus.

If the cost and nature of the construction materials allow it, as aforementioned, the pressure of the inert gas in the annulus should preferably be higher than the pressure prevailing in the reaction zone, so that in case of a pinhole or other leakage source, inert fluid will flow from the annulus to the reaction zone, and no corrosive fluids will enter the annulus from the reaction zone. Preferably, the pressure in the annulus is 20 to 300 psia higher than the pressure in the reaction zone, more preferably 100–300 psia, and even more preferably 150–250 psia. However, a lower pressure in the annulus than in the reaction zone is acceptable or reasons already mentioned, if leakage considerations are not paramount. A lower pressure in the annular space is particularly desirable when the thickness of the reaction chamber wall is low enough as to cause serious potential of collapsing or buckling.

In either case, the differential pressure between the annular space and the reaction zone should be maintained within an allowable design range, preferably about 20–300 psia, more preferably 100–300 psia, and even more preferably 150–250 psia.

The reactor of this invention may further comprise a pressure-vessel cooler, the pressure vessel having an inside surface and an outside surface. The cooler may comprise a cooling jacket at least partially surrounding the outside surface of the pressure vessel. The cooler may also comprise a cooling coil at least partially surrounded the inside surface of the the pressure vessel. The cooler may also be in the form of cooling fins on at least part of the outside surface of the pressure vessel.

The present invention also pertains to a method as described above, which further comprises a step of cooling the pressure vessel externally or internally or both, with respect to the pressure vessel.

4. BRIEF DESCRIPTION OF THE DRAWING

The reader's understanding of practical implementation of preferred embodiments of this invention will be enhanced by reference to the following description taken in conjunction with the drawing figures, wherein FIG. 1 shows a schematic diagram of a reactor according to a preferred embodiment of the present invention.

5. DETAILED DESCRIPTION OF THE INVENTION

Figure 1:
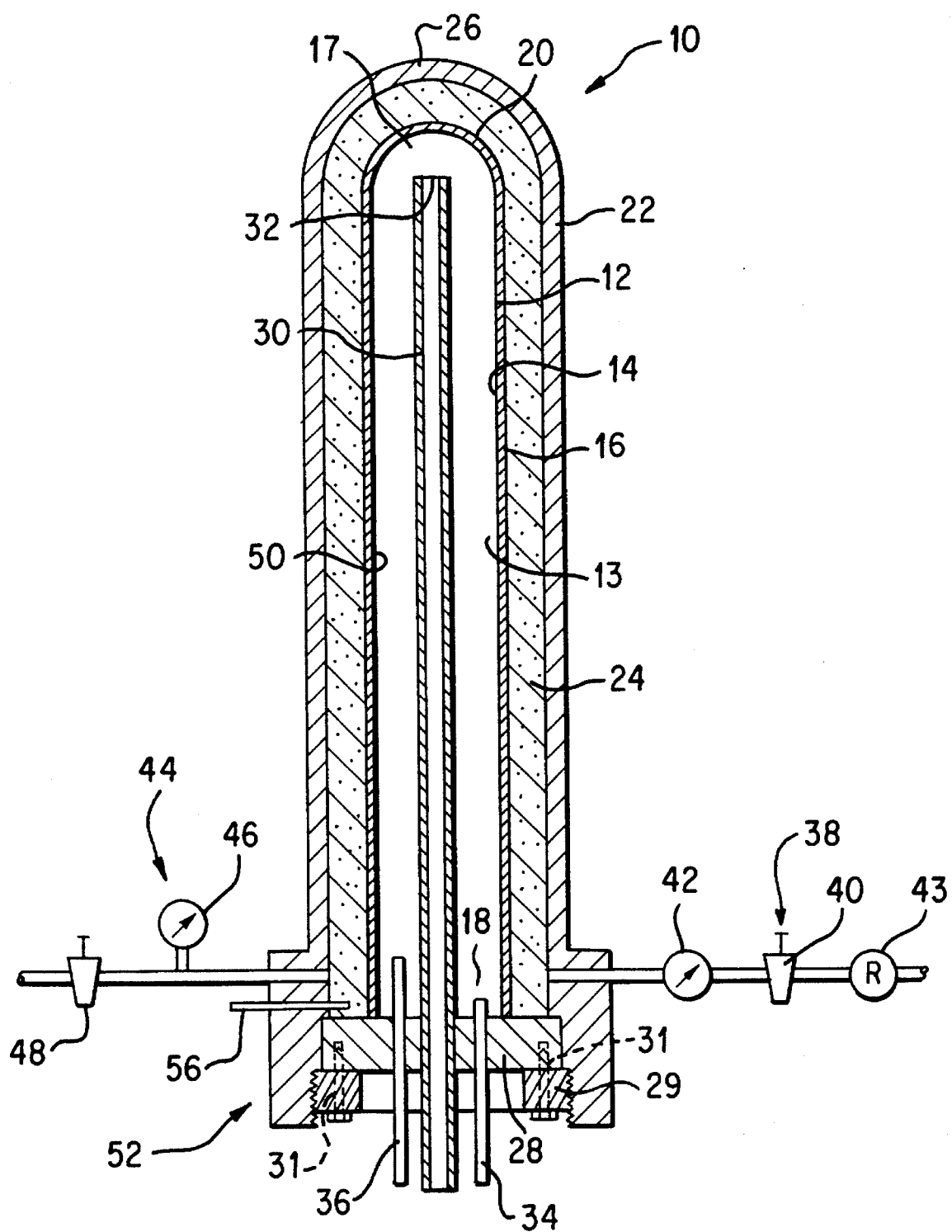

As aforementioned, this invention pertains to high pressure and high temperature reactors. More particularly, it pertains to reactors used for oxidative waste treatment under supercritical water conditions.

As also aforementioned, the use of very high pressures at elevated temperatures presents a serious problem in the construction of reactors which can withstand these adverse conditions. It is well known that as the temperature increases the strength of materials decreases drastically. Supercritical pressures (greater than about 3,200 psia) at temperatures exceeding about 1,000° F. present an enormous challenge to any construction material, let alone higher pressures (of the order of 10,000 psia) and temperatures, which may be desirable for a number of reasons, including dissolution of inorganic salts in the supercritical single phase. If in addition to the temperature/pressure challenge, one considers the harsh environment inside the reactor, the problem tends to become unsurmountable. The compromised solution to combat this undesirable situation, has been so far to utilize tube-like excessively elongated reactors of accordingly small diameter. However, this introduces in turn other disadvantages, such as heat loss, easy blockage of the tubes, excessive liner (such as noble metal for example) costs, and the like.

Other disadvantages of the conventional reactors include, but are not limited to restrictions on waste feed materials to preclude corrosive feeds and products of destruction, increased plugging potential due to small diameters, waste feed rate restrictions, increased safety hazards, increased investment cost, as discussed later, in contrast to the reactor according to this invention.

In dissimilarity, the present invention alleviates all these problems by using a critical combination of thermal insulation and chemical isolation in an annulus between a reaction chamber and a pressure vessel, as well as by arranging the elements of the reactor and their operation in a manner discussed in detail hereinafter.

The present invention allows for the construction of relatively large diameter reactors, which are not practical or possible otherwise. There are several important consequential advantages, including but not limited to:

A significantly lower ratio of internal reactor chamber surface area to reaction volume Separation of corrosive atmosphere from containment (pressure) vessel results in substantially improved process safety Reduced plugging potential More compact design The lower ratio of surface area to internal volume, made possible by the relatively large diameter enabled by the instant invention, has several technical and economic advantages, including but not limited to:

Reduced heat loss (this optimizes waste destruction efficiency) and lowers operating cost Significantly reduced material requirement for costly liner, such as a noble metal (e.g., may reduce requirement by more than tenfold), due to reduced ratio of lined surface per unit of reaction volume.

Some additional and extremely important advantages of the present invention are:

Annular space pressurization allows the use of relatively thin chamber wall, thus reducing the expense of costly materials, since the pressure vessel itself can be constructed of high strength but lower cost materials The arrangement of the feed system is such as to produce turbulent flow within the reaction zone, and thus ensure complete reaction of the waste material with the oxidant at a minimal reactor length Very little or substantially no consumption of inert gas Easy and practical detection of accidental leakage between the annulus and the reaction chamber, which presents an enormous safety benefit, as compared to other systems Considerably increased integrity of the reactor, because of the use of just one reinforced entry, the enclosure head, for all inlet and outlet connections Since the only connection of the reaction chamber to the closure head resides in a rather cool region due to quenching, there is no need for intricate expansion joints Detection of leakage between the reaction zone and the annulus is simple and reliable Little or no back-mixing within the reactor results in true plug flow characteristics Further advantages of the present invention will also be seen more clearly later. Many wastes naturally contain dissolved inorganic solids (e.g., NaCl salt). It is well known that these come out of solution as solid particles in supercritical water conditions, where temperatures are in excess of 800° F. The relatively large reaction chamber diameter, made possible by the present invention, reduces plugging potential in the reactor. Consequently, it is possible to treat wastes which otherwise might result in unacceptably low operating utility due to plugging in the reactor. Furthermore, it is highly desirable to add neutralizing agents to waste feed prior to the waste-feed heat exchanger, so that acidic hydrolysis products which form in these equipment pieces can be neutralized, thereby preventing highly undesirable corrosion. Excess neutralizing agents and neutralization salts of hydrolysis products are soluble in water at temperatures normally experienced in the waste-feed heat exchanger. However, these are known to come out of solution as solid particulates at temperatures associated with supercritical waster oxidation (e.g., temperatures equal to or greater than 800° F.). In addition, the relatively small pressure differential across the reactor chamber allows for operation at pressures required to maintain salts in solution under supercritical conditions. This is true since the reaction chamber wall thickness can remain constant as system pressure is increased, providing the annular pressure is raised with system pressure. The constant reaction chamber thickness allows for economical construction at higher pressures, since the increased pressure results only in a greater wall thickness of the inexpensive pressure shell. Previous reactor designs required thick walls, often composed of expensive corrosion resistant materials, to resist the higher pressures required for salt solubilization at high temperatures.

The relatively large reaction chamber diameter, made possible by this invention, reduces plugging potential in the reactor due to the aforementioned source, thereby making feasible the highly desirable addition of neutralization agents to the heat exchanger's waste feed. Further, thanks to the large diameter, when the there is excessive normal wear in the liner or coating, as it will explained in more detail later, the reaction chamber may be removed easily and inexpensively, and immediately replaced with a new one. In contrast, this is not possible with the conventional (hot-wall) reactors, since they play the role of both the pressure vessel and the reaction chamber.

According to a preferred embodiment of the present invention, better illustrated in FIG. 1, there is provided a reactor 10, which comprises a reaction chamber 12 having an inside wall 14, an outside wall 16, a bottom chamber end 18 and a top chamber end 20 opposite the bottom chamber end 18. The reaction chamber 12 defines or encloses a reaction zone 13 and an ignition zone 17.

The reactor 10, also comprises a pressure vessel 22, which has preferably a substantially cylindrical shape, a top vessel end 26, and a bottom vessel end 28 opposite the top vessel end 26.

The reaction chamber 12 has a similar cylindrical shape as the pressure vessel 22, and it is enclosed within the pressure vessel 22. The pressure vessel 22 and the reaction chamber 12 form an annulus 24, which is isolated from, and it does not communicate with the reaction zone 13 and the ignition zone 17. The reaction chamber may be designed for removal and replacement by means of a non permanent connection to the bottom vessel end 28. In turn, the bottom vessel end 28 may be attached to the pressure vessel 22 by means for example of a restricting nut 29 and securing bolts 31.

The reactor 10, also comprises a feeding tube 30 passing through the bottom vessel end 28 of the pressure vessel 22, and ending in a fluid exit 32 within the ignition zone 17, in the vicinity of the top chamber end 20. For the purposes of this invention, the term "vicinity" represents a region which is nominally within about two feet from the point of reference, which in this particular case is the top chamber end 20. It is important that the fluid exit 32 is directed toward and impinges on the top chamber end 20, so that it produces turbulent flow of the fluids fed, which fluids comprise the aqueous waste liquid and oxidant.

The reactor 10, further comprises an effluent output 34 at the bottom vessel end 28, and preferably a quench tube 36, which may provide quench water.

The reactor further includes an annulus pressure system. This system preferably includes an inert gas input 38, a first regulating valve 40, a flow meter 42, and a regulator 43. Also, an inert gas output 44 comprising a pressure indicator 46 and a second regulating valve 48 is furnished.

The annulus is preferably substantially filled with high-temperature resistant insulating material, which more preferably allows inert gas to pass through. The insulating material in the annulus may be relatively loosely arranged or packed tightly, and it can be selected to have a number of different forms, well known to the art, such as beads, powder, porous solid, fibers, and the like, very well known in the art. It is, however, important that regardless of the form, the material may withstand the temperatures encountered in the annulus 24 of the reactor 10. The thermal insulator may also provide structural support to the reaction chamber, especially if it is tightly packed or monolithic.

In order to maximize the structural integrity of the reactor, it is preferable that all the connections are made at just one reinforced portion of the reactor, such as for example the closure head 52. Thus, the feeding tube 30, the effluent output 34, the quench tube 36, the inert gas input 38, and the inert gas output 44, are all preferably connected to the reactor 10 through the closure head 52. Connection of some of these elements to the reactor 10 at an additional location would require reinforcement of the additional location, and would degrade the integrity of the reactor.

When the reactants used in the reaction chamber 12 are not excessively corrosive, the reaction chamber may be made of any conventional metal, such as for example stainless steel and other low cost metals. Other construction materials include, but they are not limited to ceramics, quartz, sintered alumina, mineral or ceramic composites, and the like. Since, as it will be discussed hereinafter, the reaction chamber is pressurized from all sides with relatively small pressure differentials, it only has to withstand the temperature and the atmosphere inside the reaction chamber. Thus, the reaction chamber does not have to be excessively strong.

A nominal wall thickness (distance between the inside wall 14 and the outside wall 16) may be in the range of ⅛" to ¾". However, thicknesses outside this range are not excluded.

The shape of the reaction chamber 12 is preferably tubular, with a diameter and length depending on the particular application and desired capacity. The reactor 10 may be installed at any angle from horizontal. However, it is preferably installed in a vertical mode, with the ignition zone in an upper position and the bottom vessel end at a lower position.

As aforementioned, if the atmosphere in the reaction chamber 12 is harsh and corrosive, the inside wall 14 of the reaction chamber 12 should preferably be made of or covered with a coating or liner withstanding the harsh atmosphere. The exact composition of the reaction chamber wall or wall-lining/coating is determined by the corrosive conditions experienced with the particular waste feed. However noble metals, such as platinum and gold for example, less expensive metals such as titanium and zirconium for example, ceramics, ceramic composites and other corrosion resistant materials are suitable for use. Since the reaction chamber, for the above mentioned reasons, does not need to be excessively strong, the use of highly expensive materials such as platinum or gold for example, or less expensive (but still expensive as compared to conventional construction materials) titanium or zirconium, is viable. Since the reaction chamber has a relatively low length to diameter ratio compared to conventional plug flow reactors, the interior may be easily coated with a layer of corrosion resistant such as platinum or gold for example. Prior plug flow reactors for Supercritical Water Oxidation processing did not lend themselves to cladding or coating, due to the high length to diameter ratios. Also, since the reaction chamber is not a high stress bearing member, due to the annular pressurization, a significant corrosion allowance may be designed into the reaction chamber wall thickness. Thus, the use of materials not normally suited for a particular corrosion service may be used since the reaction chamber useful life is extended by additional corrosion allowance. For waste containing chlorinated or in general halogenated compounds, the preferable material of construction comprises titanium, while for streams substantially free of halogenated compounds, the preferred construction material, preferably in the form of a liner or coating, is platinum.

Figure 2:
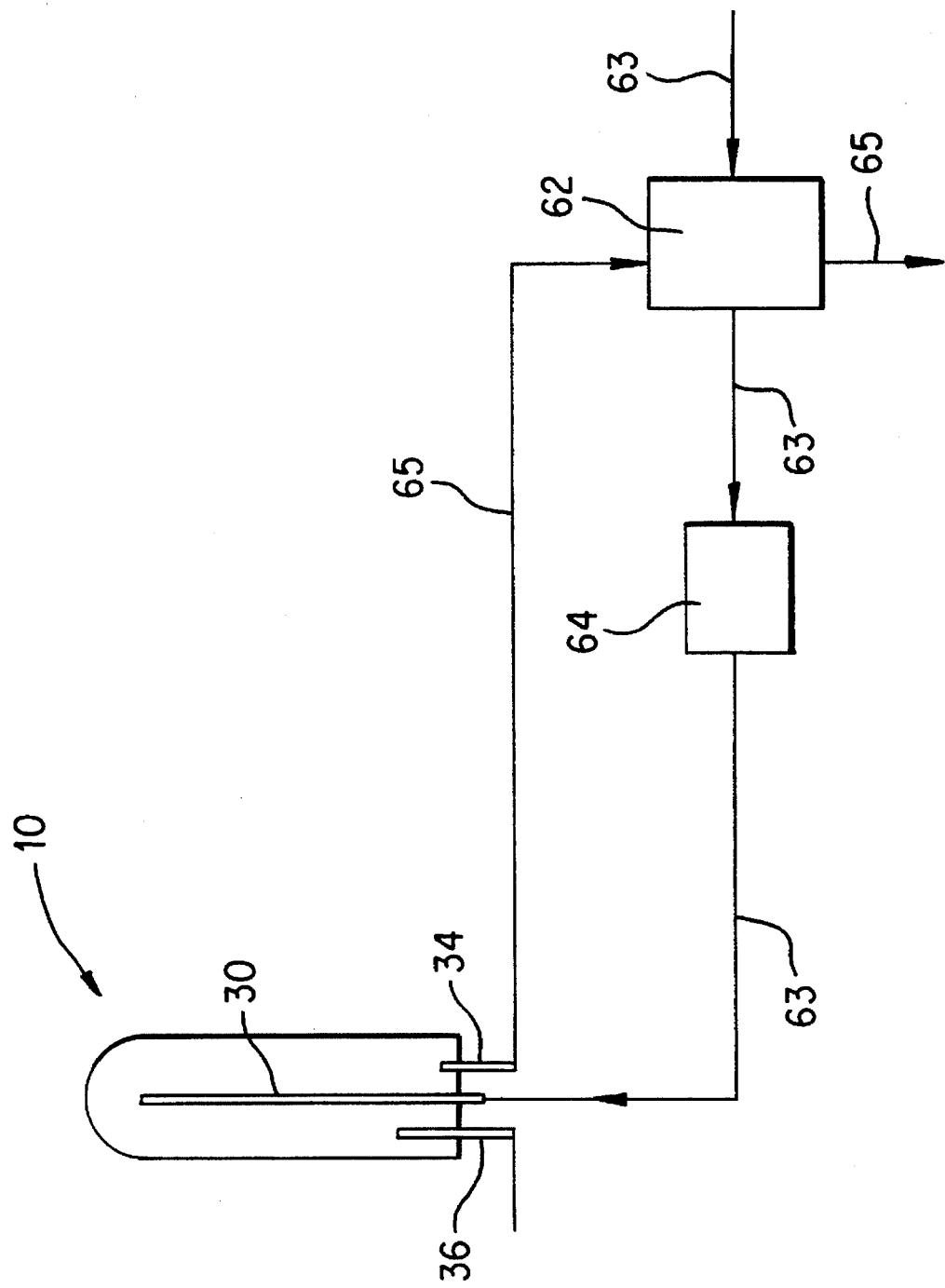
FIG. 2 illustrates a block diagram of a simplified supercritical water oxidation system which includes the reactor of the present invention.

In order to better describe the operation of the reactor of the above embodiment, an oversimplified block diagram is shown in FIG. 2, which includes a heat exchanger 62 and a heater 64. Details of the total system and its operation, excluding the reactor of the present invention, are well known to the art and are described in the aforementioned patent literature.

Considering now FIGS. 1 and 2, the operation of a system utilizing the reactor of the present invention may be briefly described so that in a following detailed description, the operation of the reactor itself may be better understood.

When the system is to start, a waste feed is pumped through the heat exchanger 62 and heater 64 through feed path 63, and enters the reactor 10 through feeding tube 30, preferably at or just under supercritical conditions. An oxidant may be added to the feed prior to the reactor, at the reactor inlet within feeding tube 30 in a supplemental concentric tube arrangement as discussed in another embodiment of this invention, or at the exit of the feeding tube 30 within the reaction chamber. At this point, the heat exchanger does not offer any heating to the waste feed, and therefore, the heater 64 has to operate at considerably higher energy consumption. The use of heat exchanger is optional since highly corrosive reactor effluent may prohibit its use, In such a case, the reactor effluent quench is used to provide significant cooling to the effluent. The heater 64 is preferably a gas heater. Neutralization additives may be added through the feeding tube 30, through additive tube arrangement as discussed in a different embodiment of this invention, through quench tube 36, as a part of the feed mixture, or a combination thereof. When the organics are oxidized, the effluent gases, being mixed with any other constituents of the reaction products, are subjected to a preliminary cooling by quench water entering the reactor 30 through quench tube 36. The preliminarily cooled products are in turn fed through effluent output 34, exit path 65 and through the other side of the heat exchanger 62, in order to be properly disposed of. As the reaction proceeds, the consumption of energy in the heater 64 becomes lower, due to the heat interchange in the heat exchanger 62, until a steady state is reached.

Coming now to the operation of the reactor 10 itself, as shown in FIG. 1, the initial preparation comprises a step to ensure that the voids left in the annulus from the thermal insulator are filled with inert fluid, and that the annulus 24 is isolated and not communicating with the reaction zone 13 of the reaction chamber 12. Inert fluid is allowed to enter the annulus by opening the first regulating valve 40, until a pressure of preferably in the range of 20 to 300 psia is attained in the annulus. At this point, the pressure in the reaction zone is about atmospheric. In sequence, if it is desired to substantially fully remove all the oxygen contained in the annulus 24, the first regulating valve 40 is closed, the second regulating valve 48 is opened in order to release the inert gas, the second valve 48 is closed once more, the first valve 40 is opened, and the annulus is pressurized with inert gas containing no oxygen, for any practical purposes, preferably to the range of 20 to 300 psia.

Inert fluid for the purposes of the present invention is a fluid which does not react with the elements present in the annulus under operating conditions. Preferable inert fluids are gases, such as for example nitrogen, helium, argon, and the like.

In one method to check whether there is a leakage problem between the annulus 24 and the reaction zone 13, provided that no other leakages are present in other connections in the region of the closure head, both valves 40 and 48 are closed after the pressure in the annulus has been set to a desired point, and said pressure is monitored on pressure indicator 46. Consistent pressure drop is indicative of a leakage.

A different way to check whether there is a leakage problem between the annulus 24 and the reaction zone 13, provided again that no other leakages are present in other connections in the region of the closure head, valve 48 is shut, valve 40 is attached to a source of pressurized fluid, and it is opened. Pressure in the annulus is set to a desired point by means of regulator 43. The flowmeter 42 is observed for continuous flow of gas, which is indicative of a leakage.

Possible leakage at other points, should be checked by well known techniques to the art, in order to avoid false conclusions.

These methods of detecting leakage or communication between the annulus 24 and the reaction zone 13 may be used not only at this stage, but also during the actual operation of the reactor. Of course, pressure and flow variations due to temperature variations and other parameters should be distinguished. Since pressure and flow variations due to leakage are continuous, distinguishing the two different types of variations is not difficult.

Still a different method to detect leakage from the reaction zone is based on attaching a moisture detector, very well known to the art, to monitor moisture level in the annulus. Since the inert gas in the annulus may be selected to be in a substantially dry state (substantially free of water), any leakage from the reaction chamber to the annulus will be detectable by the moisture detector, thus warning the operator of said leakage.

Other methods may also be used to detect leakage. However, the three methods described above according to the present invention, are highly preferable as being simple, and reliable.

After it has been established that no leakages exist, clean pressurized water and oxidant is fed to the reactor through the feeding tube 30, while the pressure is raised in the annulus and it is maintained preferably 20 to 300 psia higher than the pressure in the reaction zone, more preferably 100–300 psia, and even more preferably 150–250 psia. The pressure in the reaction chamber is raised gradually to allow for a gradual increase in the annular space pressure. When adequate pressure (>3,200 psi) is achieved in the reaction chamber, heat up of the fluid entering the reactor may begin by heater 64. When a desired temperature is reached at the reactor inlet, feed flow may be shifted to organic waste, and oxidant addition may be started.

The mixture of the waste and the oxidant ignite close to the fluid exit 32 of the feeding tube 30, and the ignited mixture impinges on the top chamber end 20, thereby producing high turbulence in the reaction zone, and considerably increased reaction rates, ensuring complete oxidation by the time the stream reaches the bottom chamber end 18. The turbulence produces excellent mixing of the waste with the oxidant, producing a real plug flow condition through the length of the reactor, and removes any possibility of back-mixing (mixing of unoxidized waste with the effluent), in contrast with other methods, such as the one described for example in U.S. Pat. No. 4,822,497, wherein back-mixing is unavoidable.

Although the temperature in the reaction zone and the chamber walls 14 and 16 of the reaction chamber confront high temperatures, the pressure differential between the two walls of the reaction chamber is maintained relatively low. On the other hand, the temperature of the pressure vessel 22 is kept low, while the pressure differential between the inside and outside portions of the vessel is rather high. This combination is very important, since metals lose their strength at increased temperatures, while they may withstand high pressure differentials at lower temperatures.

At the bottom chamber end 18, water entering through the quench tube 36 is sprayed and cools down the stream to a certain predetermined degree. The cooled down effluent leaves through effluent output 34, and follows path 65, as described before, and as better shown in FIG. 2. The rest of the operation of the whole system is a shown in FIG. 2. The reactor effluent quench may be used to inject pH adjusting additives, resolubilize salt particles, reduce the temperature of the effluent so that more conventional corrosion-resistant materials may be used, and to maintain the bottom vessel end 28 cool.

Figure 3:
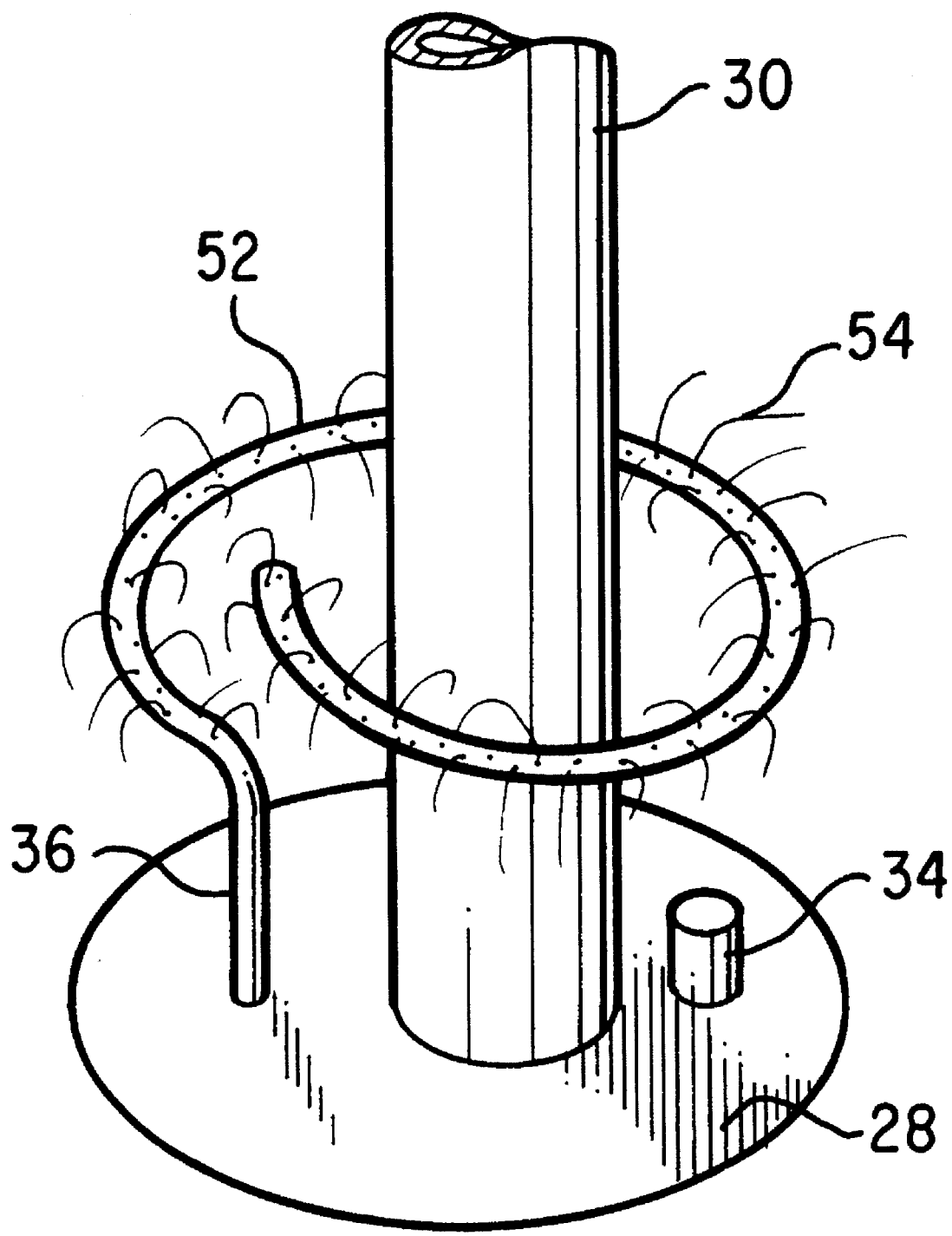
FIG. 3 shows schematically a fractional view of a preferred configuration of a quench tube according to the present invention.

For better quenching and more efficient and uniform cooling, the quench tube may be in a form of a coil around the feeding tube 30 with one or more turns 52 to provide quenching water 54 in the form of fine spray to the whole region, as better shown in FIG. 3.

The oxidant may be any conventional source of oxygen, such as for example oxygen-containing-gas, air, oxidizing agent, such as for example hydrogen peroxide, ozone, persulfates, permanganates, nitrates, and their corresponding acids, oxyacids of chlorine and their corresponding salts, hypochlorites, chlorous acid and chlorites, chlorates, perchlorates, and their corresponding acids. Mixtures of oxidants may also be used.

For the purposes of this invention, oxygen, hydrogen peroxide, and mixtures thereof are highly preferred. A free radical generating material such as hydrogen peroxide is often a useful additive. The addition of hydrogen peroxide shortens the time required for a given destruction level. Further, hydrogen peroxide can be used in place of oxygen in the feeding system. This allows for a simpler system, since the hydrogen peroxide is mixed into the waste stream before feeding, and only one pump is needed to pressurize the stream which is fed to the reactor through the feeding tube 30.

If there is chlorine, sulfur, or other compounds which produce acids when oxidized under the water supercritical conditions, or in general the conditions prevailing in the reaction zone 13, neutralization additives, such as alkali hydroxides or carbonates and the like may be added to the reaction chamber 12 through the feeding tube 30 admixed in the stream containing the aqueous waste liquid and the oxidant, through additive tubes outside the feeding tube, or through concentric tubes within the feeding tube, as described in other embodiments of this invention. Since, however, even alkali salts may be insoluble under water supercritical conditions and be deposited on the inside wall 14 of the reaction chamber 12, it becomes critical in most occasions to introduce such basic additives in the vicinity of the cooling portion, where the supercritical conditions cease to exist. Therefore, it is highly preferable that the additives are mixed with the quenching water entering the reaction chamber 12 through the quench tube 36.

Figure 4:
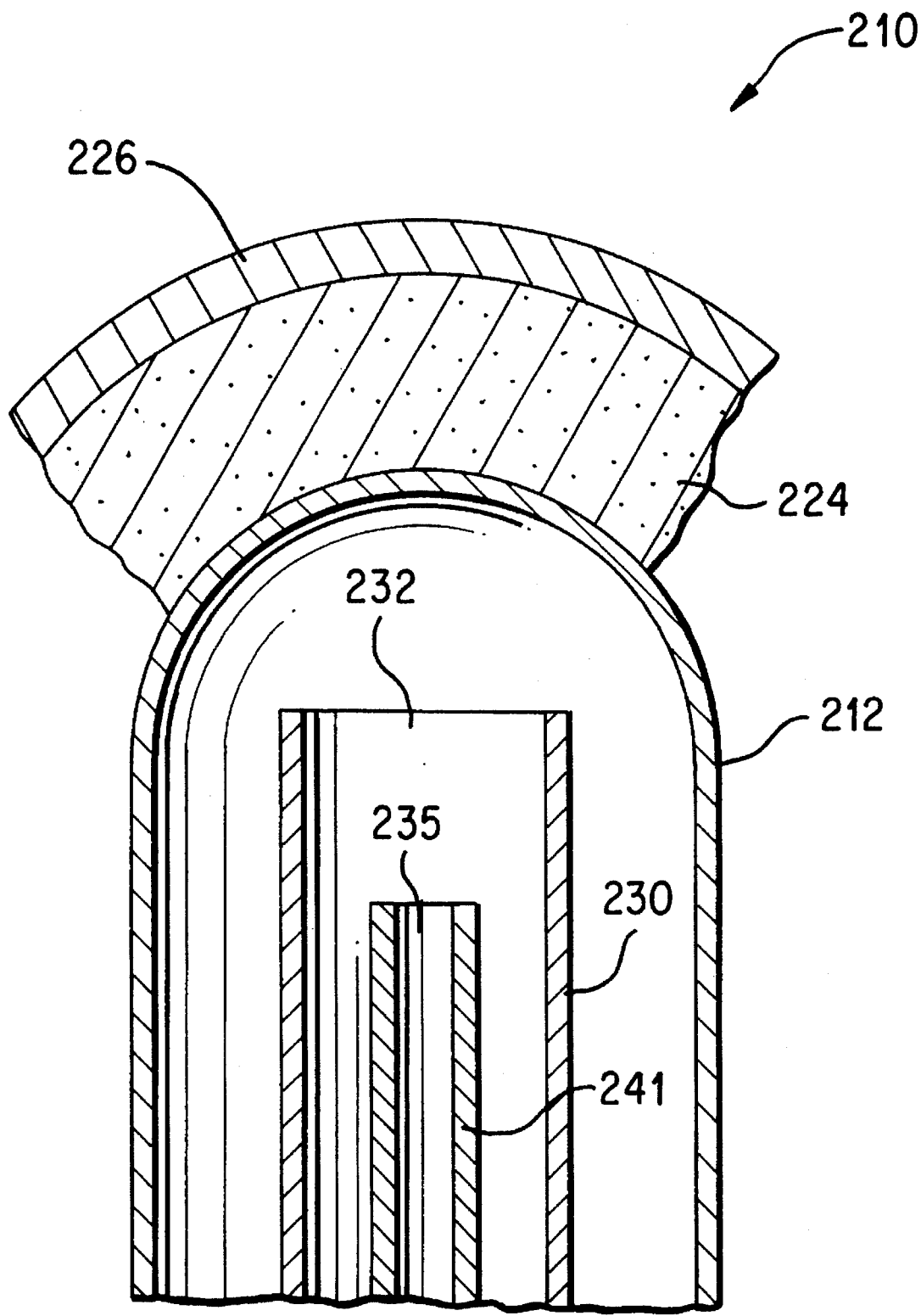
FIG. 4 illustrates a different embodiment of the instant invention, in which a supplemental concentric tube is utilized inside the feeding tube.

In a different embodiment of the present invention, better illustrated in FIG. 4, there is provided a supplemental tube 241, which is substantially concentric to the feeding tube 230. It is preferable that the concentric supplemental tube 241 ends in the vicinity of the fluid exit 232 of the feeding tube 230. For the purposes of this invention, as already mentioned, the term "vicinity" represents a region which is nominally within about two feet from the point of reference, which at this point is the fluid exit 232.

The supplemental concentric tube 241 is preferably used to introduce the oxidant into the system, while the waste stream flows inside the feeding tube 230 and outside the supplemental concentric tube 241. The importance of this arrangement is that the reaction starts at around or preferably after the fluid exit 232, so that the temperature of the supplemental concentric tube remains relatively low. This in turn allows the use of less expensive construction materials for the supplemental concentric tube, and at least the inside surfaces of the feeding tube. The high turbulence around the fluid exit 232 allows excellent mixing of the oxidant with the waste stream.

In addition to oxidants, other first constituents, such as for example reactants, diluents, additives, and the like may also be introduced through the supplemental concentric tube 241.

Although the supplemental concentric tube is shown as having an open end 235, the open end 235 may be actually closed and replaced by perforations or other openings (not shown), if so desired.

More than one supplementary tubes may be used, preferably concentric with respect to each other for feeding different first constituents.

The operation of this embodiment is very similar to the operation of the other embodiments, already described, with the difference that the oxidant is mixed with the waste stream in the vicinity of the end 235 of the supplemental concentric tube 241 instead of being premixed with said waste stream.

Figure 5:
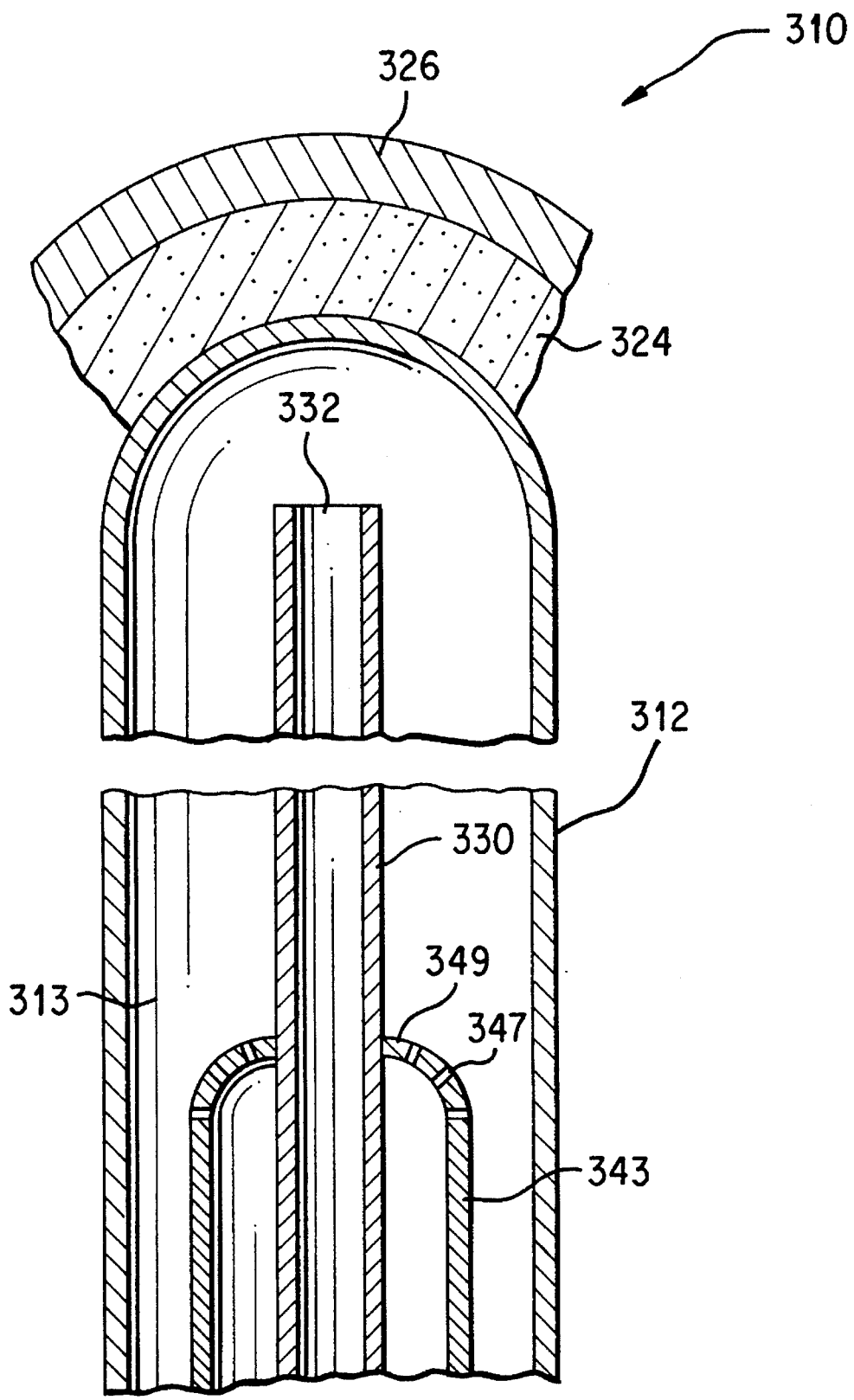
FIG. 5 illustrates still a different embodiment of the instant invention, in which a additive tube is utilized surrounding the feeding tube.

In still another embodiment of the present invention, better illustrated in FIG. 5, there is provided an additive tube 343, which is substantially concentric with feeding tube 330. The additive concentric tube 330 has a closed end 349 with perforations 347, through which second constituents may be introduced into the reaction zone 313.

Examples of the second constituents may comprise oxidants, other reactants, additives, recycled streams, diluents, and the like.

In most cases, it is preferable that the end 349 is disposed closer to the bottom chamber end (18 in FIG. 1), than to the fluid exit 332 of the feeding tube 330.

Although the additive concentric tube 343 is shown as having a closed end 349, the closed end 349 may be actually open, and the perforations eliminated, if so desired.

More than one additive tubes may be used, preferably concentric with respect to each other for feeding different second constituents.

The operation of this embodiment is very similar to the operation of the other embodiments, already described, with the difference that additives, may be added in a desired position of the reaction zone 313.

In a different embodiment of the present invention, the pressure vessel is cooled in order to maintain an as low as possible temperature during operation. This is important, since the thickness of the pressure vessel may be lowered and a lower-cost construction material may be used.

Examples of ways to cool the pressure vessel are given in FIGS. 6 through 9.

Figure 6:
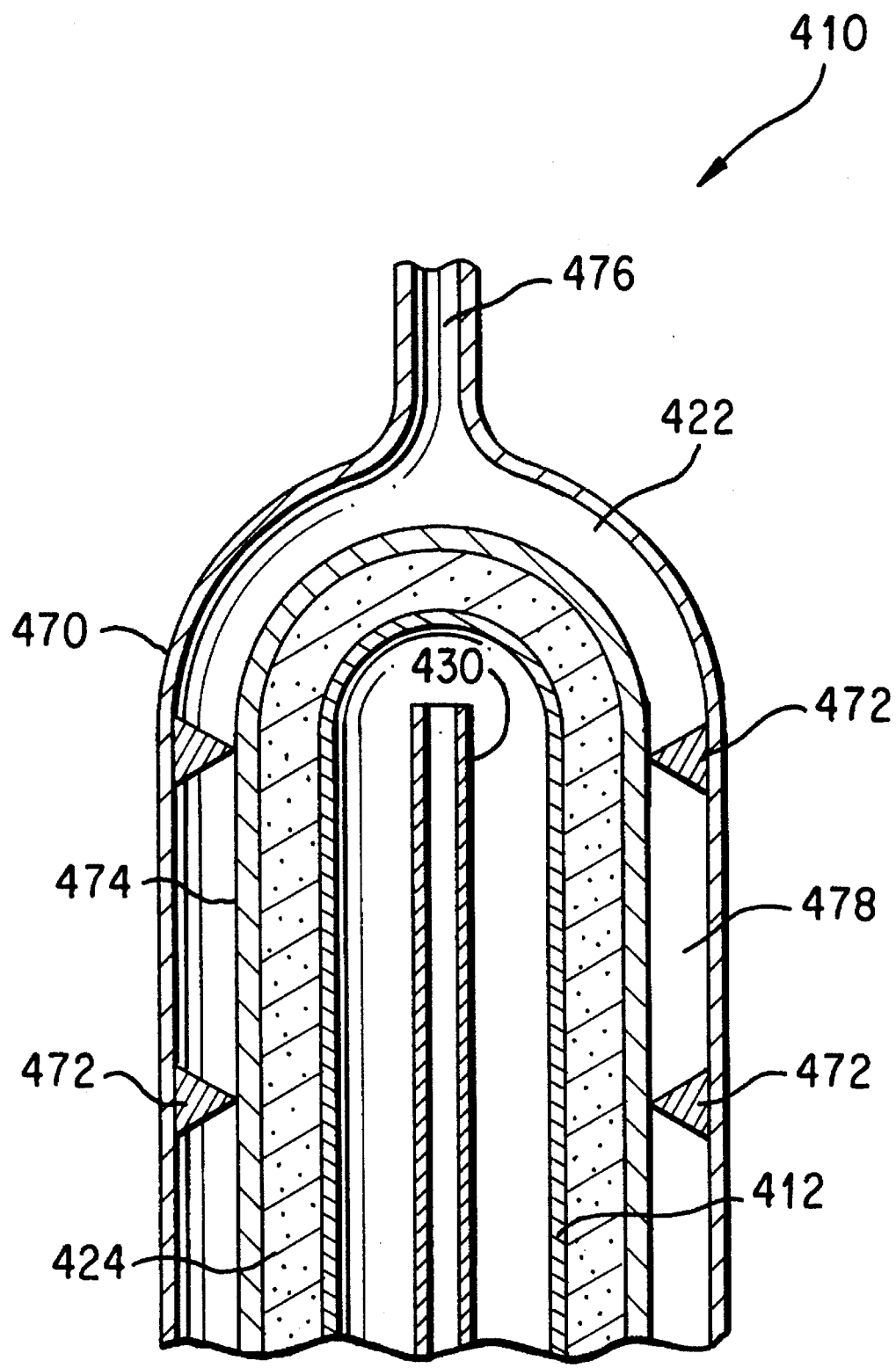
FIG. 6 is a schematic diagram illustrating a reactor according to a different embodiment of the present invention, wherein the pressure vessel is surrounded by a cooling jacket.

Referring now to FIG. 6, there is provided a cooling jacket 470, surrounding the pressure vessel 422. Spacers 472 are used to hold the jacket 470 at a distance from the outside surface 474 of the pressure vessel 422. The cooling jacket 470 has a first opening 476 and a second opening (not shown) preferably at the other end of the jacket (not shown), for passing cooling fluid, preferably liquid, through the space 478 between the outside surface 474 and the cooling jacket 470. The opening 476 may be either an inlet or an outlet for the cooling fluid, depending on the particular prevailing conditions. However, it is preferable in most cases for the opening 476 to be an outlet of the cooling fluid. The cooling fluid is preferably water, and more preferably water containing rust inhibitors, well known to the art. Other liquids may also be used as cooling fluids.

The operation of this embodiment is similar to the operation of the previously described embodiments, with the difference that at least part of the pressure vessel is cooled by a cooling fluid passing through space 478 between the outside surface 474 of the pressure vessel 422, and the jacket 470 to keep the temperature of the pressure vessel as low as possible.

Figure 7:
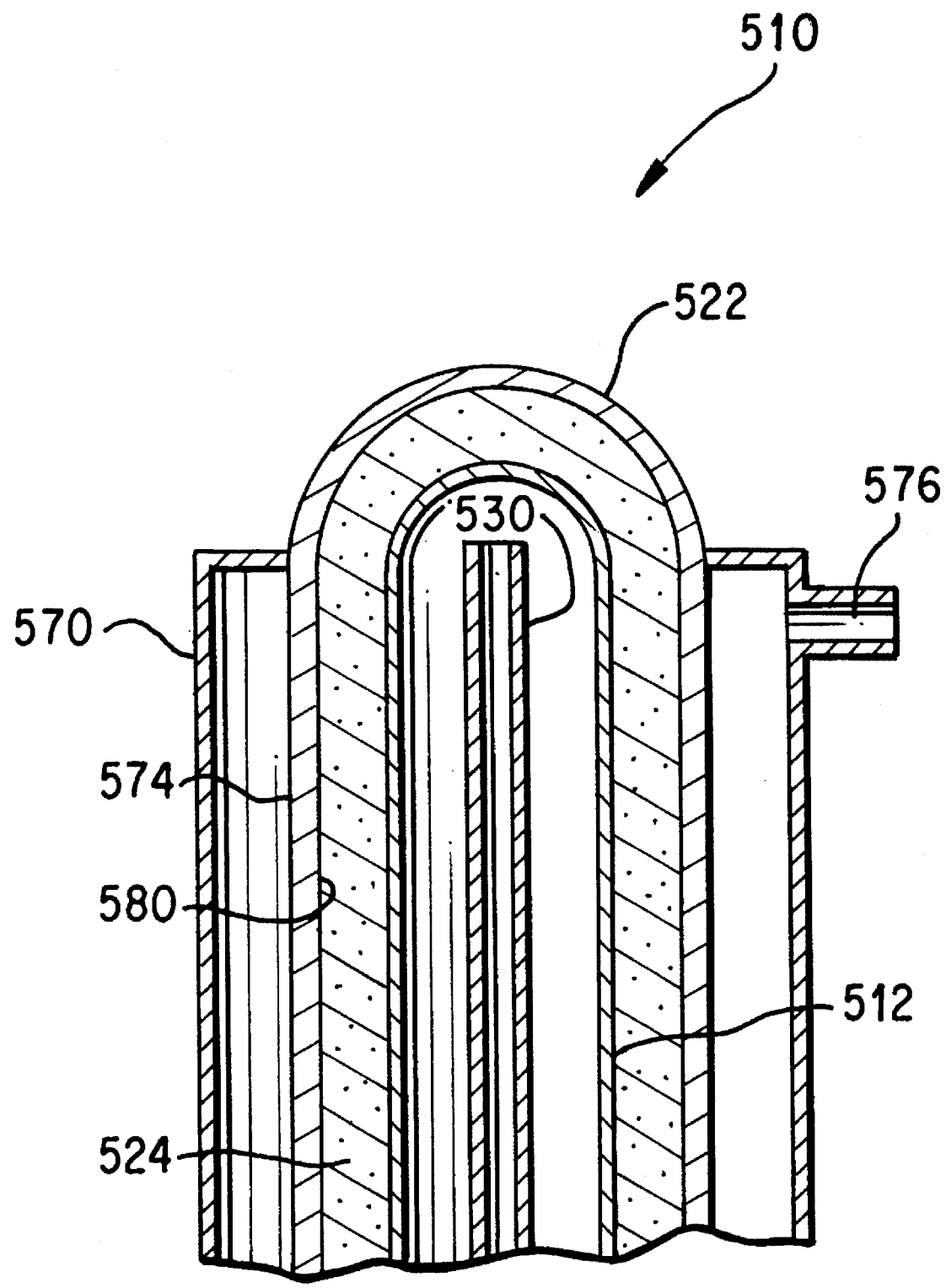
FIG. 7 is a schematic diagram illustrating a reactor according to a different embodiment of the present invention, wherein the pressure vessel is surrounded by a cooling jacket having a different configuration as compared to the jacket of FIG. 6.

FIG. 7 illustrates 510 having a cooling jacket 570 partially surrounding the outside surface 574 of the pressure vessel 522. The operation of this embodiment is substantially the same as the operation of the embodiment of FIG. 6, and therefore it needs no further explanations.

Figure 8:
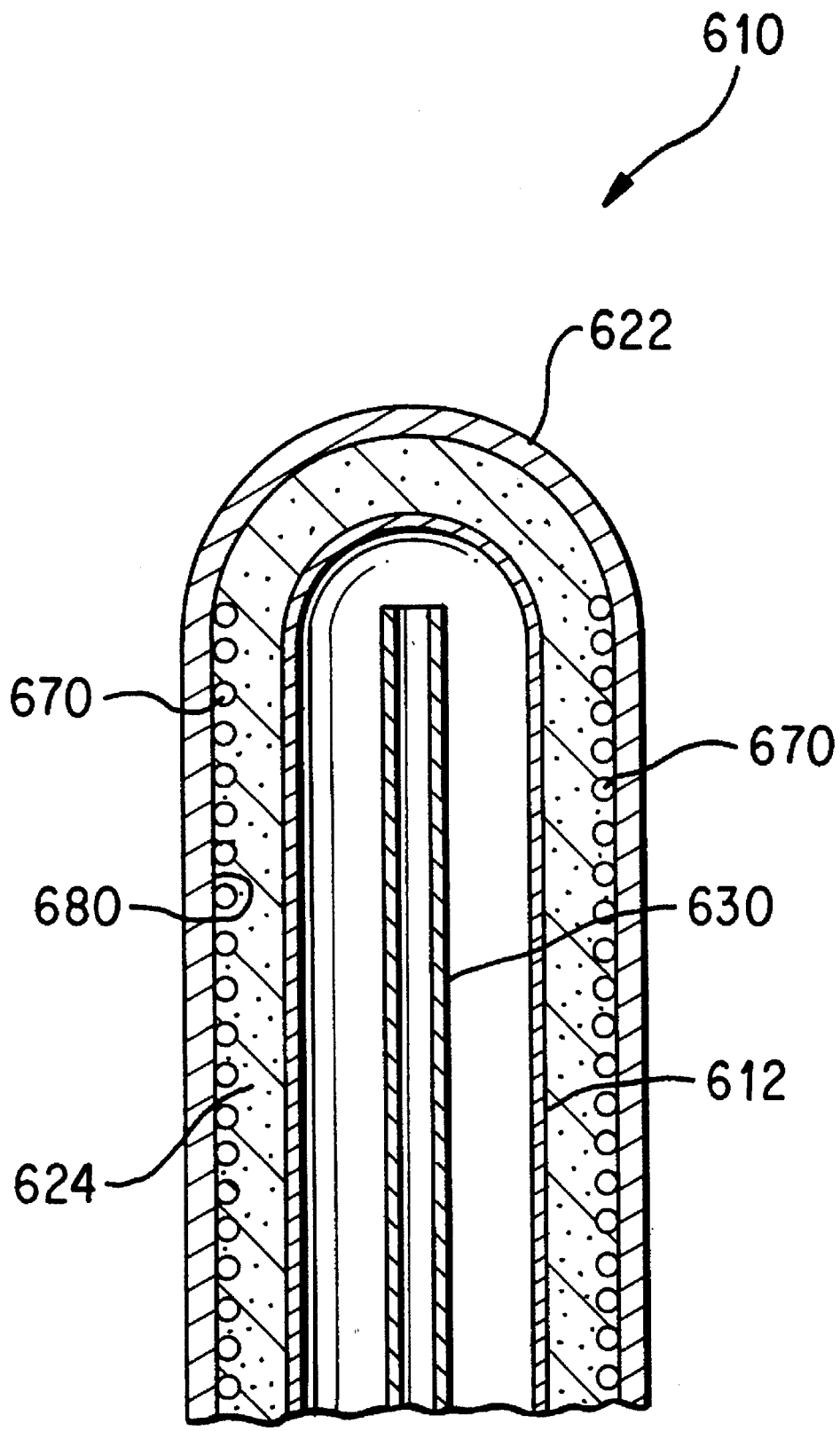
FIG. 8 is a schematic diagram illustrating a reactor according to a different embodiment of the present invention, wherein the pressure vessel surrounds a cooling coil.

In a still different embodiment of the present invention, better illustrated in FIG. 8, there is provided a cooling coil 670 inside the annulus 624, in close proximity, and preferably in contact with the inside surface 680 of the pressure vessel 622. The inlet and outlet (not shown) of the coil are located preferably in the vicinity of the bottom vessel end (28 in FIG. 1). The coil may be a separate element, or an integral part of the pressure vessel, or even it may be embedded within the walls of the pressure vessel.

Since the pressure inside the annulus 624 varies considerably during different steps of the process, the use of a coil is preferable as compared to the use of an internal jacket, since a coil may withstand high pressures and pressure variations at considerably lower wall thicknesses, with more effective heat transfer and considerably lower cost. However, use of a coil on the outside surface of the pressure vessel, or use of an internal cooling jacket is possible and within the scope of the instant invention.

The operation of this embodiment is substantially the same as the operation of the embodiments exemplified in FIGS. 6 and 7, and therefore, it needs no further explanations.

Figure 9:
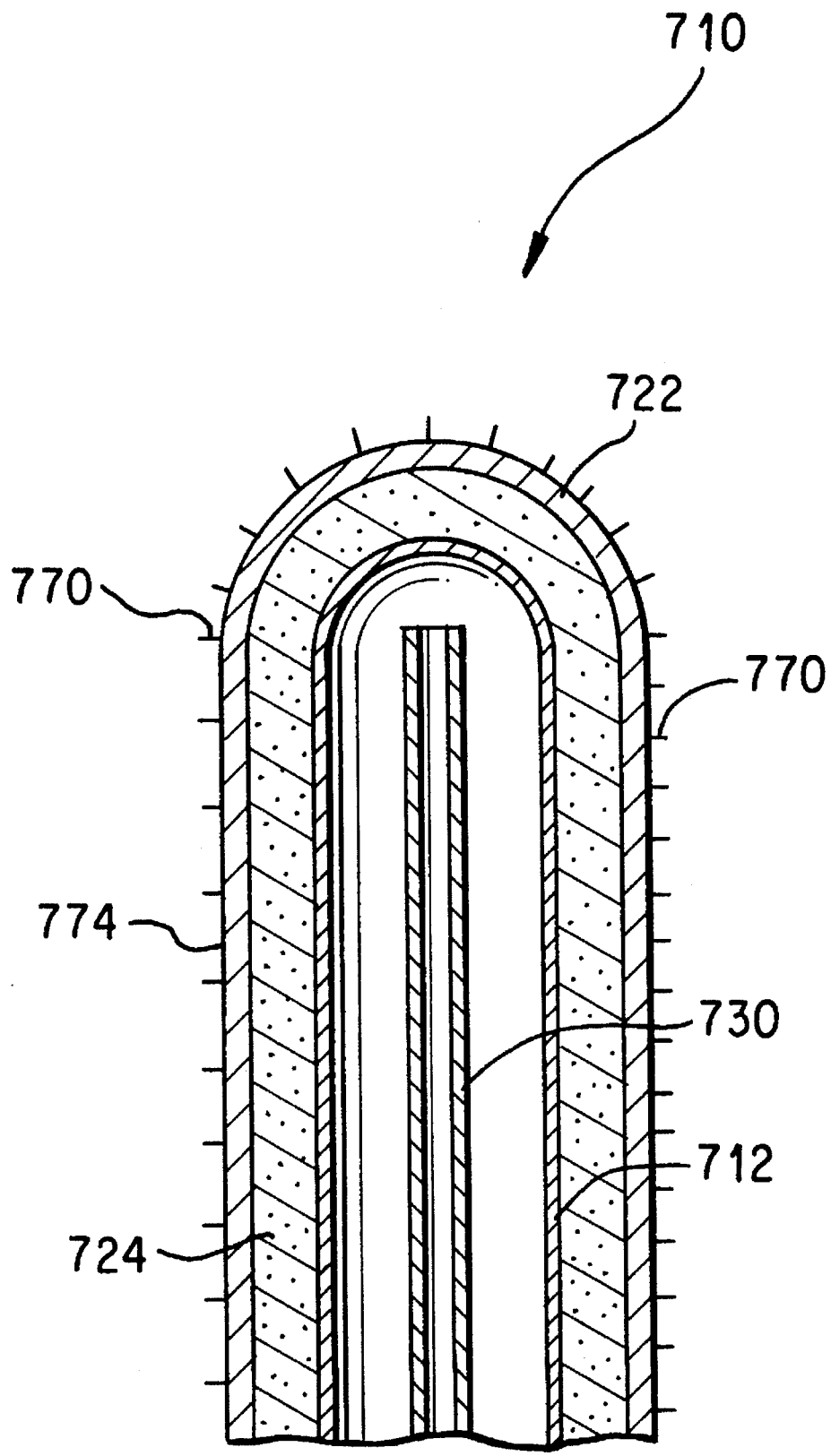
FIG. 9 is a schematic diagram illustrating a reactor according to a different embodiment of the present invention, wherein the pressure vessel comprises a plurality of cooling fins on its outside surface.

In another preferred embodiment of the present invention, better shown in FIG. 9, there are provided cooling fins 770 attached at least part of the outside surface 774 of the pressure vessel 722. Cooling fins are very well known to the art. They may be in the form of thin sheets, rods, bars, and the like, arranged in a manner to conduct heat out of the pressure vessel, with or without the help of a cooling stream of forced air from appropriately positioned fans (not shown).

The operation of this embodiment is substantially the same as the operation of the embodiments exemplified in FIGS. 6, 7, and 8, with the difference that air cooling is used instead of water cooling, and therefore, it needs no further explanations.

The temperature of the pressure vessel should preferably be maintained under 700° F., and more preferably under 500° F. Water cooling may bring the temperature of the pressure vessel to considerably lower levels, approaching ambient temperature at least in the case of the outside surface 474 of FIG. 6, for example.

It should be pointed out that in the different embodiments of the present invention, oxygen could be replaced by other oxidants or mixtures of oxidants, or mixtures of oxidants and other gases or liquids. It should also pointed out that the reactors of the present invention are particularly useful in the case of supercritical water conditions, especially in the presence of corrosive compounds, such as for example halogens, and the like.

The examples and the description of the above embodiments have been given for illustrated purposes only and they should not be construed as restricting the scope of the present invention.

In the different figures of the drawing, numerals differing by 100 represent elements which are either substantially the same or perform the same function. Therefore, in the case that one element has been defined once in a certain embodiment, its re-definition in other embodiments illustrated in the figures by the same numerals or numerals differing by 100 is not necessary, and it has been often omitted in the above description for purposes of brevity.

What is claimed is:

1. A reactor for treating an aqueous liquid, comprising:
a pressure vessel having a first vessel end, a second vessel end substantially opposite the first vessel end, an inside wall, and an outside wall;
a reaction chamber substantially enclosed within the pressure vessel, the reaction chamber having a first chamber end, a second chamber end, an inside wall and an outside wall, the pressure vessel and the reaction chamber forming an annulus, the reaction chamber defining a reaction zone, the reaction zone being substantially isolated from the annulus, wherein said annulus comprises a thermal insulator which allows an inert gas to pass through, and which insulates a substantial portion of the reaction chamber from the annulus;
an annulus pressure system coupled to the annulus and being configured to pressurize the annulus with a substantially inert fluid during use;
an annulus cooler coupled to the outside wall of the pressure vessel and being configured to cool an outside wall of the annulus by cooling an outside wall of the pressure vessel during use;
a feeding conduit ending in a fluid exit in the reaction chamber; and
an effluent output.

2. A reactor as defined in claim 1, further comprising a quencher at a vessel end.

3. A reactor as defined in claim 1, wherein the annulus is substantially filled with the thermal insulator.

4. A reactor as defined in claim 3, wherein the thermal insulator is in a form selected from a group consisting of high temperature beads, high temperature powder, high temperature solid porous material, and a combination thereof.

5. A reactor as defined in claim 3, wherein the thermal insulator provides mechanical support to the reaction chamber.

6. A reactor as defined in claim 3, further comprising an inert fluid inlet adaptable to introduce fluid to the annulus.

7. A reactor as defined in claim 3, wherein the annulus is pressurized, and further comprising a detector connected to the annulus and adaptable to detect accidental communication between the reaction zone and the annulus.

8. A reactor as defined in claim 3, wherein the reactor chamber comprises titanium as construction material.

9. A reactor as defined in claim 3, wherein the inside wall of the reaction chamber is covered with a liner material resistant to attack by reactants, products of reaction and effluents.

10. A reactor as defined in claim 9, wherein the liner material comprises titanium.

11. A reactor as defined in claim 9, wherein the liner material comprises a noble metal.

12. A reactor as defined in claim 11, wherein the noble metal comprises platinum.

13. A reactor as defined in claim 1, wherein the thermal insulator in the annulus is packed high-temperature resistant material.

14. A reactor as defined in claim 1, wherein the reaction chamber is removable.

15. A reactor as defined in claim 1, further comprising a supplemental conduit contained within the feeding conduit and being substantially concentric with the feeding conduit, for introducing first constituents in said feeding conduit.

16. A reactor as defined in claim 15, wherein a first constituent comprises an oxidant.

17. A reactor as defined in claim 15, wherein the supplemental conduit ends in the vicinity of the fluid exit.

18. A reactor as defined in claim 1, further comprising an additive conduit at least partially surrounding the feeding conduit and being substantially concentric with the feeding conduit, for introducing second constituents in the reaction zone.

19. A reactor as defined in claim 18, wherein a second constituent comprises an oxidant.

20. A reactor as defined in claim 1, further comprising an inert fluid inlet adaptable to introduce fluid to the annulus.

21. A reactor as defined in claim 1, wherein the annulus is pressurized, and further comprising a detector connected to the annulus and adaptable to detect accidental communication between the reaction zone and the annulus.

22. A reactor as defined in claim 1, wherein the reactor chamber comprises titanium as construction material.

23. A reactor as defined in claim 1, wherein the inside wall of the reaction chamber is covered with a liner material resistant to attack by reactants, products of reaction and effluents.

24. A reactor as defined in claim 23, wherein the liner material comprises titanium.

25. A reactor as defined in claim 23, wherein the liner material comprises a noble metal.

26. A reactor as defined in claim 1, wherein the cooler comprises a cooling jacket at least partially surrounding the outside surface of the pressure vessel.

27. A reactor as defined in claim 1, wherein the cooler comprises a cooling coil at least partially surrounded the inside surface of the pressure vessel.

28. A reactor as defined in claim 1, wherein the cooler comprises cooling fins on at least part of the outside surface of the pressure vessel.

29. A reactor as defined in claim 1, wherein the annulus pressure system is configured to maintain a higher pressure in the annulus than pressure in the reaction zone during use.

30. A reactor as defined in claim 29, wherein the annulus pressure system is configured to maintain the pressure in the annulus 20 to 300 psia higher than pressure in the reaction zone during use.

31. A reactor as defined in claim 1 wherein the annulus pressure system is configured to maintain a pressure in the annulus which is equal to or lower than pressure in the reaction zone during use.

32. A reactor as defined in claim 31, wherein the pressure in the annulus is 0 to 300 psia lower than the pressure in the reaction zone during use.

33. A reactor as defined in claim 1 wherein the pressure vessel is substantially cylindrical.

34. A reactor as defined in claim 1 the fluid exit is directed toward the second end of the chamber in a manner to produce turbulent flow of fluids exiting the fluid exit and impinging on the second end of the chamber.

35. A reactor as defined in claim 1, further comprising a pH adjusting system adapted to introduce a pH adjusting additive to the reactor, the pH adjusting system comprising a conduit connected to introduce a pH adjusting additive to the reactor.

36. A reactor as defined in claim 1 wherein the reactor is elongated and comprises a removable head which is adapted to be connected to the first vessel end.

37. A reactor as defined in claim 1 wherein the reactor is elongated and comprises a removable head which is connected to the first vessel end, and wherein the second vessel end is not connected to a removable head.

38. A reactor as defined in claim 1 wherein the reactor is elongated and comprises a removable head which is connected to the first vessel end, and wherein the inside wall of the reaction chamber comprises a substantially continuous corrosion resistant coating.

39. A reactor as defined in claim 1 wherein the reactor is elongated and comprises a removable head which is connected to the first vessel end, and wherein the fluid exit is directed toward the second end of the chamber in a manner to produce turbulent flow of fluids exiting the fluid exit and impinging on the second end of the chamber.

40. A reactor as defined in claim 1 wherein the reactor is elongated and comprises a removable head which is connected to the first vessel end, wherein the inside wall of the reaction chamber comprises a substantially continuous corrosion resistant coating, and wherein the fluid exit is directed toward the second end of the chamber in a manner to produce turbulent flow of fluids exiting the fluid exit and impinging on the second end of the chamber.

41. A reactor as defined in claim 1 wherein the reactor is elongated and comprises a removable head which is adapted to be connected to the first vessel end, and wherein the reaction chamber is removable by disconnecting the removable head and withdrawing the reaction chamber from the pressure vessel.

42. A reactor as defined in claim 1 wherein the reactor is elongated and comprises a removable head which is adapted to be connected to the first vessel end, and further comprising a quencher connected to direct cooling fluid into the reaction chamber such that cooled fluid contacts the removable head during use.

43. The reactor of claim 1 wherein the reaction chamber is removable by disconnecting the removable head and withdrawing the reaction chamber from the pressure vessel.

44. A reactor for treating an aqueous liquid, comprising:
a substantially elongated pressure vessel having a first vessel end, a second vessel end substantially opposite the first vessel end, an inside wall, an outside wall, and wherein the first vessel end comprises a removable head;
a reaction chamber substantially enclosed within the pressure vessel, the reaction chamber having a first chamber end, a second chamber end, an inside wall and an outside wall, and wherein the pressure vessel and the reaction chamber forming an annulus, the reaction chamber defining a reaction zone, the reaction zone being substantially isolated from the annulus, wherein said annulus comprises a thermal insulator which allows an inert gas to pass through, and which insulates a substantial portion of the reaction chamber from the annulus;
an annulus pressure system coupled to the annulus and being configured to pressurize the annulus with a substantially inert fluid during use;
a feeding conduit connected to enter the reaction chamber at or proximate to the first end of the vessel and ending in a fluid exit in the reaction chamber;
an effluent output connected to exit the reaction chamber at or proximate to the first end of the vessel; and
a quencher connected to direct fluid into the reaction chamber such that cooled fluid contacts the first end of the vessel during use.

45. A reactor for treating an aqueous liquid, comprising:
a substantially elongated pressure vessel having a first vessel end, a second vessel end substantially opposite the first vessel end, an inside wall, an outside wall, and wherein the first vessel end comprises a removable head;
a reaction chamber substantially enclosed within the pressure vessel, the reaction chamber having a first chamber end, a second chamber end, an inside wall and an outside wall, and wherein the inside wall of the reaction chamber comprises a substantially continuous coating of a corrosion resistant material, and wherein the pressure vessel and the reaction chamber forming an annulus, the reaction chamber defining a reaction zone, the reaction zone being substantially isolated from the annulus, wherein said annulus comprises a thermal insulator which allows an inert gas to pass through, and which insulates a substantial portion of the reaction chamber from the annulus;
an annulus pressure system coupled to the annulus and being configured to pressurize the annulus with a substantially inert fluid during use;
a feeding conduit connected to enter the reaction chamber at or proximate to the first end of the vessel and ending in a fluid exit in the reaction chamber;

an effluent output connected to exit the reaction chamber at or proximate to the first end of the vessel; and a quencher connected to direct fluid into the reaction chamber such that cooled fluid contacts the first end of the vessel during use.

46. A reactor for treating an aqueous liquid, comprising:

a pressure vessel having a first vessel end, a second vessel end substantially opposite the first vessel end, an inside wall, an outside wall, and wherein the first vessel end comprises a removable head;

a reaction chamber substantially enclosed within the pressure vessel, the reaction chamber having a first chamber end, a second chamber end, an inside wall and an outside wall, and wherein the pressure vessel and the reaction chamber forming an annulus, the reaction chamber defining a reaction zone, the reaction zone being substantially isolated from the annulus, wherein said annulus comprises a thermal insulator which allows an inert gas to pass through, and which insulates a substantial portion of the reaction chamber from the annulus;

an annulus pressure system coupled to the annulus and being configured to pressurize the annulus with a substantially inert fluid during use;

a feeding conduit connected to enter the reaction chamber at or proximate to the first end of the vessel and ending in a fluid exit in the reaction chamber; and an effluent output connected to exit the reaction chamber at or proximate to the first end of the vessel.

47. The reactor of claim 46 wherein the reaction chamber is removable by disconnecting the removable head and withdrawing the reaction chamber from the pressure vessel.

48. The reactor of claim 46, further comprising a pressure-vessel cooler comprising a cooling jacket at least partially surrounding the outside surface of the pressure vessel.

49. The reactor of claim 46, further comprising a pressure-vessel cooler comprising a cooling coil at least partially surrounded the inside surface of the pressure vessel.

50. The reactor of claim 46, further comprising a pressure-vessel cooler comprising cooling fins on at least part of the outside surface of the pressure vessel.

51. The reactor of claim 46 wherein the annulus pressure system is configured to maintain a higher pressure in the annulus than pressure in the reaction zone during use.

52. The reactor of claim 46 wherein the annulus pressure system is configured to maintain the pressure in the annulus 20 to 300 psia higher than pressure in the reaction zone during use.

53. The reactor of claim 46 wherein the annulus pressure system is configured to maintain a pressure in the annulus which is equal to or lower than pressure in the reaction zone during use.

54. The reactor of claim 46 wherein the fluid exit is directed toward the second end of the chamber in a manner to produce turbulent flow of fluids exiting the fluid exit and impinging on the second end of the chamber.

55. The reactor of claim 46, further comprising a pH adjusting system adapted to introduce a pH adjusting additive to the reactor, the pH adjusting system comprising a conduit connected to introduce a pH adjusting additive to the reactor.

56. The reactor of claim 46 wherein the reactor is elongated.

57. The reactor of claim 46 wherein the reactor is elongated and wherein the second vessel end is not connected to a removable head.

58. The reactor of claim 46 wherein the reactor is elongated and wherein the inside wall of the reaction chamber comprises a substantially continuous corrosion resistant coating.

59. The reactor of claim 46 wherein the reactor is elongated and wherein the fluid exit is directed toward the second end of the chamber in a manner to produce turbulent flow of fluids exiting the fluid exit and impinging on the second end of the chamber.

60. The reactor of claim 46 wherein the reactor is elongated and wherein the inside wall of the reaction chamber comprises a substantially continuous corrosion resistant coating, and wherein the fluid exit is directed toward the second end of the chamber in a manner to produce turbulent flow of fluids exiting the fluid exit and impinging on the second end of the chamber.

61. The reactor of claim 46 wherein the reactor is elongated and wherein the reaction chamber is removable by disconnecting the removable head and withdrawing the reaction chamber from the pressure vessel.

62. The reactor of claim 46 wherein the reactor is elongated and further comprising a quencher connected to direct cooling fluid into the reaction chamber such that cooled fluid contacts the first end during use.

63. The reactor of claim 46 wherein the reaction chamber is removable by disconnecting the removable head and withdrawing the reaction chamber from the pressure vessel.

64. The reactor of claim 46, further comprising a quencher at the first end.

65. The reactor of claim 46, wherein the annulus is pressurized, and further comprising a detector connected to the annulus and adaptable to detect accidental communication between the reaction zone and the annulus.

* * * * *